US010389917B2

(12) United States Patent
Siegeritz

(10) Patent No.: US 10,389,917 B2
(45) Date of Patent: Aug. 20, 2019

(54) METHOD FOR OPTIMIZED COLOR CONTROL IN A PRINTING MACHINE

(71) Applicant: HEIDELBERGER DRUCKMASCHINEN AG, Heidelberg (DE)

(72) Inventor: Helmut Siegeritz, Kronshagen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/903,686

(22) Filed: Feb. 23, 2018

(65) Prior Publication Data

US 2018/0278804 A1 Sep. 27, 2018

(30) Foreign Application Priority Data

Mar. 22, 2017 (DE) ........................ 10 2017 204 787

(51) Int. Cl.
*H04N 1/60* (2006.01)
*G06F 17/17* (2006.01)

(52) U.S. Cl.
CPC ......... *H04N 1/6019* (2013.01); *G06F 17/175* (2013.01); *H04N 1/6033* (2013.01)

(58) Field of Classification Search
CPC .. H04N 1/6019; H04N 1/6033; G06F 17/175; G06F 3/1218; G06F 3/122
See application file for complete search history.

(56) References Cited

U.S. PATENT DOCUMENTS

| | | | |
|---|---|---|---|
| 6,275,607 B1 | 8/2001 | Shimizu et al. | |
| 6,335,800 B1 | 1/2002 | Balasubramanian | |
| 2001/0038459 A1 | 11/2001 | Mahy | |

FOREIGN PATENT DOCUMENTS

| | | |
|---|---|---|
| DE | 69839002 T2 | 1/2009 |
| EP | 1146726 A1 | 10/2001 |

*Primary Examiner* — Kent Yip

(74) *Attorney, Agent, or Firm* — Laurence A. Greenberg; Werner H. Stemer; Ralph E. Locher

(57) ABSTRACT

A method for printing on a printing machine with color space transformation using tables formed of n-dimensional orthogonal grids includes printing and colorimetrically measuring a test chart in a target color space providing measured values corresponding to sampling points in the color space, interpolating between the sampling points to determine further sampling points, and using existing sampling points to create an ICC table for color space transformation between target and process color spaces. A computer isolates combinations of n−1-dimensional partial grids for process color combinations from grids of the table in the process color space. Partial grids are converted into two-dimensional segments. Sampling points of segments are modified, removing nonrequired sampling points and distributing sampling points in the partial grid. The partial grids are reintegrated into the grid and color management of the printing operation and the printing operation using the reduced ICC table occurs.

8 Claims, 12 Drawing Sheets

METHOD FOR OPTIMIZED COLOR CONTROL IN A PRINTING MACHINE

CROSS-REFERENCE TO RELATED APPLICATION

This application claims the benefit, under 35 U.S.C. § 119, of German Patent Application DE 10 2017 204 787.9, filed Mar. 22, 2017; the prior application is herewith incorporated by reference in its entirety.

BACKGROUND OF THE INVENTION

Field of the Invention

The present invention relates to a method for optimized color administration to carry out a printing operation in a printing machine.

The technical field of the present invention is the field of color control in a printing operation.

A simulation of multicolor printing operations is important especially if the intention is to find out if and to what degree of accuracy predefined spot colors such as Pantone colors may be reproduced in a printing operation. Printing machines, in particular inkjet printing machines, require special inks that are specifically suitable for the purpose, not just any type of printing ink. Thus, in most cases, spot colors need to be reproduced by a suitable combination of proportions of the print colors that are available. Since there are in general many different combinations to reproduce a spot color, that is to say that there is ambiguity due to the number of print colors, in an accurate process simulation, for instance with respect to combining colors, it is possible to select combinations that are particularly stable in terms of process fluctuation.

In general, a simulation is also used on a computer monitor to inform a user of the restrictions that will arise because some colors cannot be reproduced when image data that have been created for a different printing operation such as seven-color lithographic offset printing are reproduced in the current printing operation.

The established ICC color profiles in accordance with ISO 15076 envisage a simple structure for representing the simulation, namely basically cubic or rather hypercubic paraxial orthogonal grids having sampling points, and interpolation for any points between the sampling points.

If there are no more than 4 input dimensions, i.e. print color channels such as CMYK, the ICC table structure is easy to handle. An example for the memory space required for a transformation from CMYK to Lab with 16ˆ4 grid points and 16 bit Lab output values corresponding to 2 bytes, per Lab channel:16ˆ4*3*2=393216 bytes or 384 kB.

In a 7-color print, that amounts to 16ˆ7*3*2=1610612736 bytes or 15728664 kB (1536 MB). Since there are usually many profiles on a computer for different printing conditions such as substrates, inks, screen, primer, varnish etc. the memory space soon becomes disproportionate. A way out is to reduce the number of sampling points per print color channel to a considerable extent, for instance from 16 to 7, but that affects the accuracy of the simulation.

Another solution that would be possible in accordance with the ICC specification is a different number of sampling points for different dimensions/print colors, but that does in fact not solve the problem because it is desirable to have an accurate representation in particular of all main axes, corresponding to 0% to 100% of a print color.

Another known method, which is independent of ICC profiles, uses subspaces of a process space as a function of a dominant print color, in particular black. The fineness of the gradation of the subspaces varies: for instance, at 100% K, the CMYK test chart in accordance with ISO 12642-2, also referred to as IT8.7/4 has a CMY subgrid with only 3ˆ3 sampling points, whereas at 0% K there is a CMY subgrid with 9ˆ3 sampling points. The reason for that is that the perceived distance between dots in a CMY grid overprinted with much black is smaller than in a grid with little black. Such a structure defined by the test chart may directly be used for the simulation of the process if one first interpolates in the subgrids neighboring a given K value and then interpolates with K between the partial results. The distribution of the points in the process space with the different planes of black is illustrated in FIG. 11.

In summary, that method, however, only allows one dimension i.e. print color to be split off because the respective subgrids in K have different CMY grid conditions. Since in a 7-color printing operation using black and blue, those two colors frequently interact with the other print colors in similar ways, a method that factors in the two in similar ways is sought. In addition, a reduction of the number of dots in a non-channel-wise uncoupled way would be helpful in a way to scan the closer vicinity of a solid color such as 100% K more finely and the farther surroundings more coarsely.

For that purpose, European Patent Application EP 1 146 726 A1, corresponding to U.S. Patent Application Publication US 2001/0038459, discloses a method for creating a printing model for a printing machine wherein a color target is used to create the printer model. The printer model is used to predict the color values produced by the printing device when the device is addressed by colorant values specific to the color control of the printing device. The printer model is defined by a number of sampling points in both color spaces. When they are printed by the printing machine, the color patches, which correspond to the number of sampling points, form the color target. The method reduces the set of sampling points by removing those sampling points for which, within defined tolerances, neighboring sampling points may be predicted in the color space.

However, a disadvantage of that method is that it is not merely the color distance of sampling points that is important in such a printer model but also the absolute position of the sampling points. Thus, in the end, that method likewise only reduces the number of sampling points. Yet it is not only the perceived distance of the sampling points or table points relative to one another that is important but also the relevance thereof when applied in the printing process. For instance, if in 7-color printing there is an upper ink application limit of 320% for the total of all print color portions due to a limited drying time, a large proportion of a table in accordance with ICC, which goes up to 700% for the total, will never get used. In addition, it does not make much sense to use process color combinations of colors that are opposite one another in the Lab color space such as yellow and blue or cyan and orange to produce a color. Such areas of the process space may likewise be considered less relevant. In more general terms, the process range that is important for practical use ought to be scanned more carefully and the unused or hardly used range ought to be scanned more coarsely.

Other possible models described in the technical literature are mathematical models including adapted parameters. Among those as the simplest model is the Neugebauer model or the Kubelka-Munk model. Those models are very favorable in terms of memory space requirements but in practice they are mostly too inaccurate because in particular the overprinting of halftone colors using frequency-modulated or stochastic screens causes local effects in the process space, the exact simulation of which would make the models very complicated. In addition, many model parameters such as the opacity as opposed to the reflectance of color layers may only be determined by more complex physical measurements. Moreover, the application of suitable models to very large image files takes much more time than the comparatively easy sampling point interpolation method.

SUMMARY OF THE INVENTION

It is accordingly an object of the invention to provide a method for optimized color control in a printing machine, which overcomes the hereinafore-mentioned disadvantages of the heretofore-known methods of this general type and which provides a method for implementing color space transformations for controlling color administration in a printing operation in an optimized and resource-saving way.

With the foregoing and other objects in view there is provided, in accordance with the invention, a method for carrying out a printing operation on a printing machine with computer-assisted color space transformation by using tables in the form of n-dimensional orthogonal grids wherein a test chart suitable for the printing operation is printed and colorimetrically measured in a target color space, the measured values generated in this way correspond to sampling points in the measured target color space, an interpolation is made between the sampling points to determine further sampling points, and the existing sampling points are used to create an ICC table for color space transformation between the target color space and a process color space for the printing operation. The method further includes the steps of isolating suitable combinations of n−1-dimensional partial grids for corresponding process color combinations from the n-dimensional orthogonal grids of the ICC table in the process color space by using the computer, converting these partial grids into a sequence of at least two-dimensional segments, modifying the sampling points of the individual at least two-dimensional segments in such a way that non-required sampling points are removed so that the sampling points in the partial grid are evenly distributed, reintegrating the partial grids into the n-dimensional orthogonal grid, and carrying out color management of the printing operation and the printing operation using the ICC table that has been reduced in this manner.

The core of the method of the invention is to reduce redundant sampling points, i.e. sampling points that are not mandatory for color transformation purposes. In particular when more than four colors are involved in a multicolor printing operation, these unnecessary sampling points make the color transformation extremely complex and time-consuming. The starting point of the method of the invention is the fact that in a color space transformation into the process color space, the supporting points that are measured in the target color space and thus generated and form the corner points of the grid that delimits the reachable target color space, are distorted in a corresponding way. This results in a great accumulation of individual sampling points in the grid of the process color space. As a result, due to the distortion, many of these existing sampling points are not necessary at all to describe the printable range in the process color space. As a consequence, the present invention proposes to thin these redundant sampling points out. This is attained by isolating the multidimensional and orthogonal grids that result from the ICC table for the process color space into n−1-dimensional partial grids for all possible process color combinations. This means that these n−1-dimensional partial grids are split off the original n-dimensional orthogonal grid. Thus, in the simplest case of a three-dimensional color space, two-dimensional partial grids are generated from the three-dimensional color space. This may be imagined as an onion-like structure with a three-dimensional onion body assembled of individual approximately two-dimensional onion skins in a corresponding layered configuration. In these partial grids redundant sampling points will then be removed. Not only is it possible to remove sampling points but also to shift them in a suitable way. This means that the final set of sampling points does not have to be a subset of the original set. The aim is to achieve an even distribution of the sampling points in the corresponding n−1-dimensional partial grid. Having achieved this, the n−1-dimensional partial grids are recombined to form the regular n-dimensional grid and the resultant reduced ICC table is used for color management purposes in the printing operation in a corresponding way.

Advantageous and thus preferred further developments of the present invention will become apparent from the associated dependent claims as well as from the description and the associated drawings.

Another preferred development of the printing machine of the invention in this context is that the process color space is the CMYK color space or a process space containing the CMYK color space as a subset and the measured target color space is the Lab color space. In the printing industry, the process color space is virtually always the CMYK color space. It may be extended to include additional colors such as orange, green, or purple. It may contain additional colors or individual CMYK colors may be exchanged for an additional color. The target color space is the Lab color space, because the measurement devices that measure and examine the print result in terms of the attained color values, determine the color values in the Lab color space.

A further preferred development of the printing machine of the invention in this context is that the at least two-dimensional segments are structured to be L-shaped in the two-dimensional space and that in higher-dimensioned spaces, the L-shaped segments are adapted in accordance with the additional dimensions. In the case of a three-dimensional color space and corresponding two-dimensional segments, the latter have an L-shaped structure. For corresponding higher-dimensional partial grids, the corresponding segments are three-dimensional, for instance. The L-shaped segments are adapted in accordance with the higher dimensions. Thus, in a three-dimensional process space, the L-shaped segments are three respective interconnected squares that are perpendicular to one another.

An added preferred development of the printing machine of the invention in this context is that the even distribution of sampling points is achieved by a reduction of sampling points on the one-dimensional axes of the at least two-dimensional segments. Within the at least two-dimensional segments the even distribution of the sampling points is achieved by removing corresponding surplus, i.e. redundant, sampling points within the two-dimensional segments on corresponding one-dimensional axes. Usually one-dimensional axes on which the sampling points are located may be identified in the at least two-dimensional segments. A corresponding even distribution of the sampling points along the axes thus makes the most sense.

An additional preferred development of the printing machine of the invention in this context is that the even distribution of the sampling points is achieved by reducing the density of the at least two-dimensional segments in the partial grid. A further option to ensure an even distribution of the sampling points is to ensure the density of the at least two-dimensional segments in the corresponding multidimensional partial grid. Therefore, since multidimensional color spaces are being dealt with, the redundant sampling points may for instance not only be oriented along one-dimensional axes in the segments of the partial grid but may also occur due to the fact that too many sampling points arise in the individual planes of the n−1-multidimensional partial grid. Coming back to the onion skin analogy, this would mean that sampling points on onion skin 2 are too close to sampling points on onion skin 3 or 1. In this case it makes sense to reduce the density of the at least two-dimensional segments in the n−1 multidimensional partial grid by removing individual areas of the at least two-dimensional segments.

Another preferred development of the printing machine of the invention in this context is that for more than two-dimensional partial girds the even distribution of the sampling points is achieved not only by a reduction of the density of the two-dimensional segments in the same two-dimensional partial grid but also by a reduction of at least two-dimensional segments of neighboring higher-dimensional skins from other directions of the process space. In this context, the reduction of the density of the at least two-dimensional segments to ensure an even distribution of sampling points may be achieved both by removing areas of the at least two-dimensional segment and by removing corresponding areas in neighboring two-dimensional segments.

A further preferred development of the printing machine of the invention in this context is that the number n of the dimensions in the orthogonal grids of the ICC table is dependent on the number of process colors that are used. The number of the dimensions in the orthogonal grids in the color space as defined by the ICC table is always dependent on the number of process colors that are used. This is due to the fact that the method of the invention isolates n−1-dimensional partial grids for all possible process color combinations in the process color space, which means that the number of dimensions is directly dependent on the number of process colors that are used.

A concomitant preferred development of the printing machine of the invention in this context is that in a further step, the ICC table that has been reduced in accordance with the invention is used to create a reduced test chart, in which the reduced sampling points of the ICC table correspond to reduced color patches of the test chart. With the aid of the ICC table that has been reduced by the method of the invention, a corresponding reduced test chart may be generated in a further step of the method. Since a corresponding number of sampling points has been removed from the ICC table, a corresponding number of sampling points have naturally been removed in the process color space, and since these sampling points in the process color space correspond to test patches in the test chart for color management, it is thus possible to create a reduced test chart having correspondingly fewer test patches. This means a considerable reduction of the effort that the color control/color management operations require in the printing operation because a correspondingly lower number of test patches in the test chart needs to be printed, measured, and monitored in the course of the ongoing color management process for the current print job.

Other features which are considered as characteristic for the invention are set forth in the appended claims.

Although the invention is illustrated and described herein as embodied in a method for optimized color control in a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention as such as well as further developments of the invention that are advantageous in structural and functional terms will be described in more detail below with reference to the associated drawings and based on at least one preferred exemplary embodiment.

DETAILED DESCRIPTION OF THE INVENTION

Figure 1:
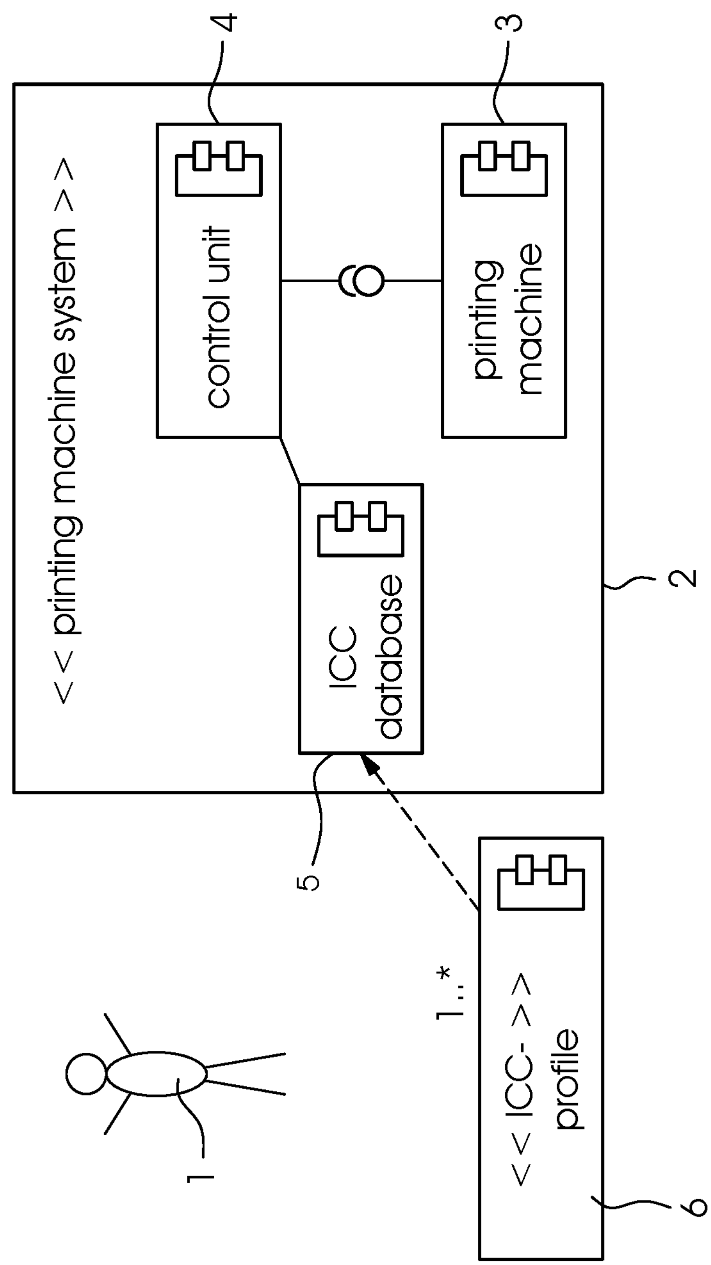
FIG. 1 is a block diagram illustrating the structure of a printing machine system being used according to the invention.

Referring now in detail to the figures of the drawings, in which identical reference symbols identify mutually corresponding elements, and first, particularly, to FIG. 1 thereof, there is seen a block diagram of a printing machine system 2, on which the method of the invention is preferably implemented. In addition to an inkjet printing machine 3 itself, the system is formed of an inkjet printing machine control unit 4 on which ICC profiles 6 to be corrected are saved in a database 5. Apart from the control unit 4 of the printing machine 3, any other computer that allows an operator 1 to access the color management of the printing operation may be used.

The preferred embodiment of the method of the invention has a number of requirements:

It is to take up much less memory space than the current ICC profiles 6. It is to be able to reduce information where it is redundant in a perception-adapted way. Moreover, it is to be able to reduce information where it is irrelevant to process use. The application to image data is to require little computing time and experiments outside the used printing operation are to be avoided.

Figure 12:
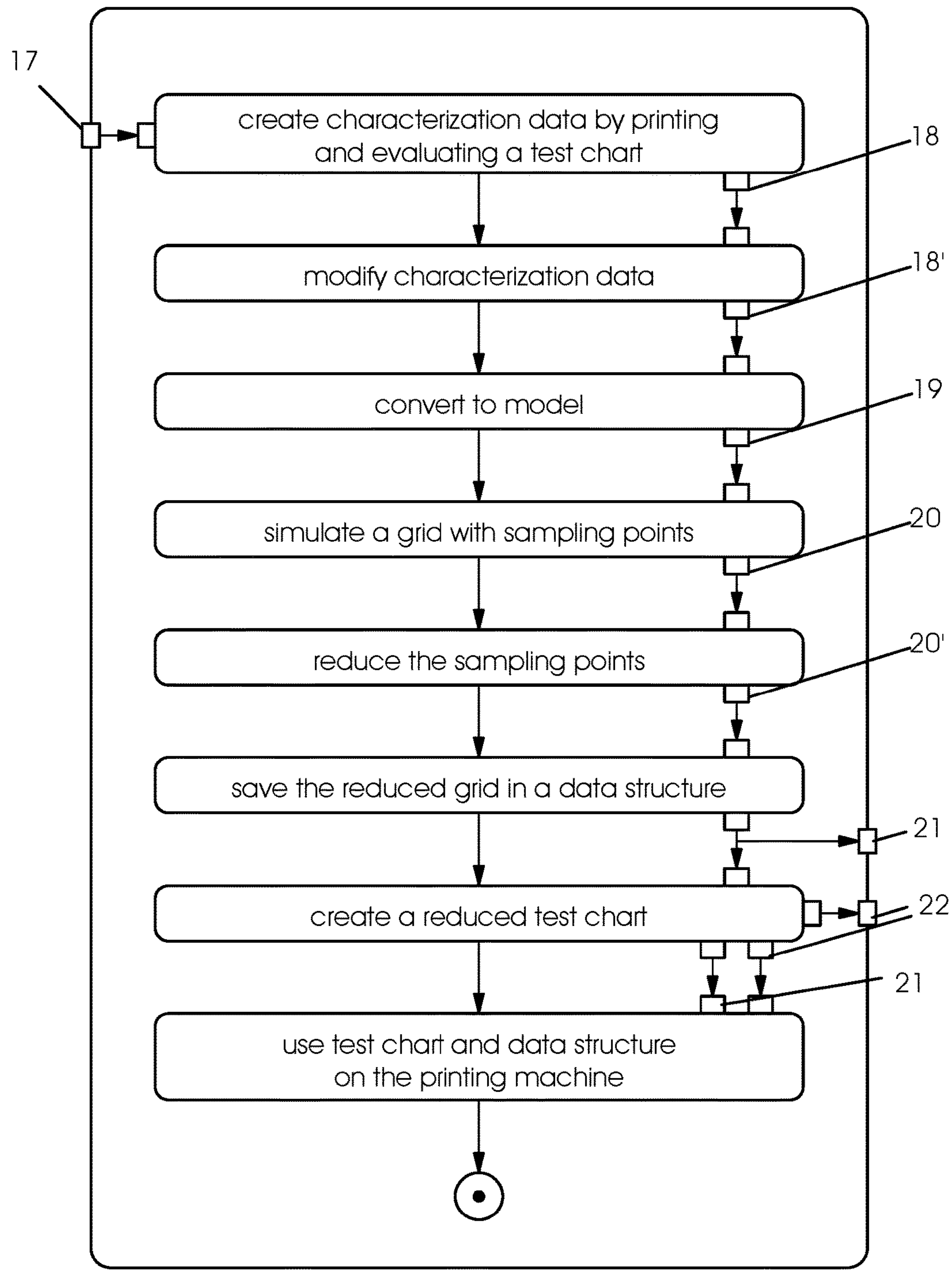
FIG. 12 is a flow chart illustrating the method of the invention.

FIG. 12 is a flow chart of the method of the invention. The colorimetric characteristics of a printing operation are determined by printing and colorimetrically measuring a test chart 17 formed of a larger number of color patches with different combinations of color proportions of the print colors. Just as the method described herein reduces the number of points for a color transformation table as compared to tables 6 in accordance with ICC, it is also possible to reduce the number of color patches for a test chart 17 compared to a simple regular scanning. For this purpose, the first step is to very broadly establish the process characteristics in the form of characterization data 18 using a comparatively small regular test chart 17 formed of combinations of the values 0%, 40%, and 100%. For a 7-color print, for instance, this results in 3ˆ7=2187 color patches, of which one leaves out some inadmissible combinations amounting to a total color amount of more than 400%, specifying arbitrarily selected measured values in the vicinity of black instead, resulting in modified characterization data 18'. Based on such a coarse grid, one determines the parameters of a simple mathematical model 19 such as a modified Neugebauer model for the entire process. Through the use of the method described herein, a regular fine grid 20 that has been coarsely simulated by this process may be converted to a version 20' that has a much reduced number of points. The remaining points form a test chart 22 for an expedient, more accurate scanning of the process. The associated measured color values in Lab may then immediately be entered into a memory-optimized data structure 21 in accordance with the method of the invention, which will be described in more detail below.

It is assumed that the principle of color transformation of the print color proportions, e.g. C, M, Y, K, R, G, B in percentages, into the colorimetric Lab values is already known. This information is obtained by printing and colorimetrically measuring a suitable test chart 17 and interpolating between the measured points.

Now the point is to represent the information in a more compact way than by a multidimensional orthogonal grid 20 as in the tables of conventional IC profiles 6.

Figure 2:
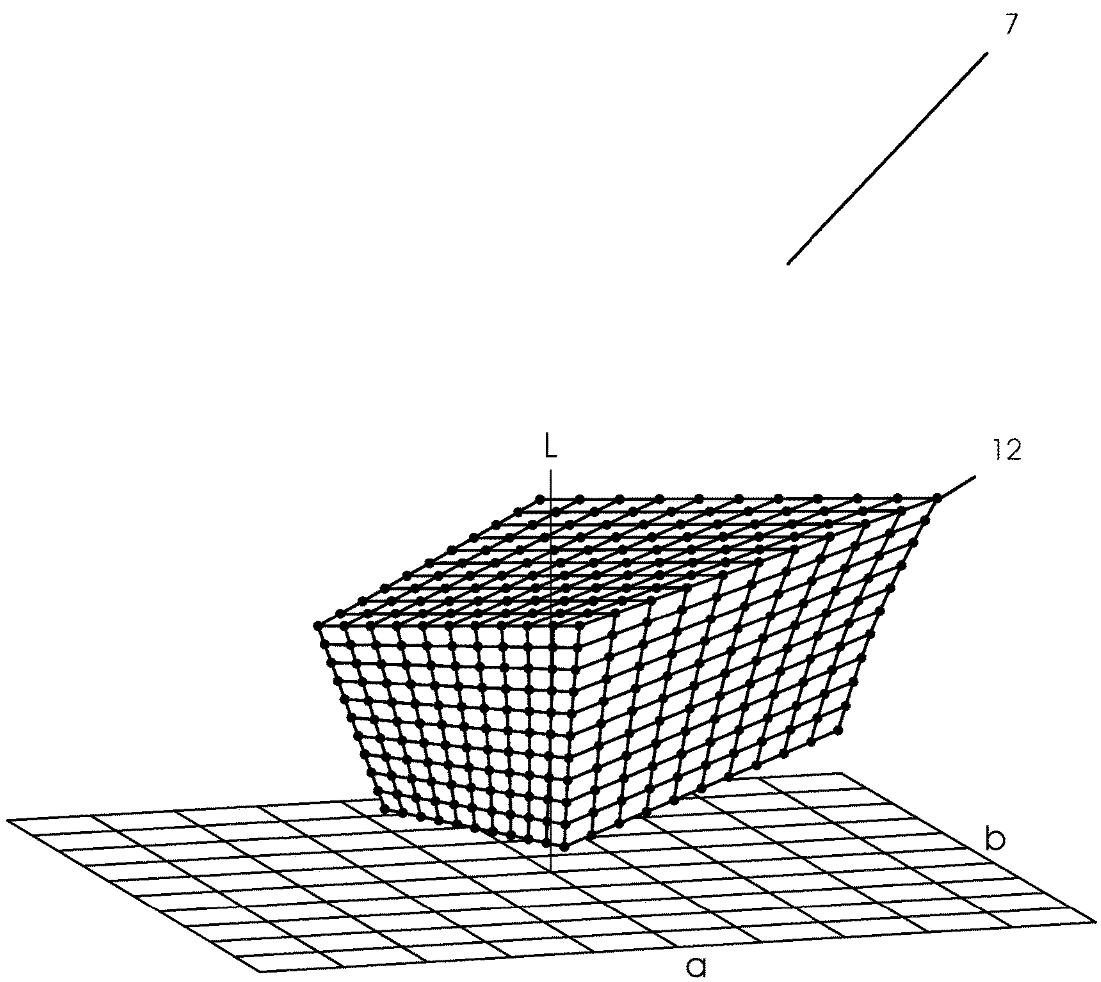
FIG. 2 is a perspective view of an example of a multidimensional grid defined by an ICC table in the Lab color space.
Figure 3:
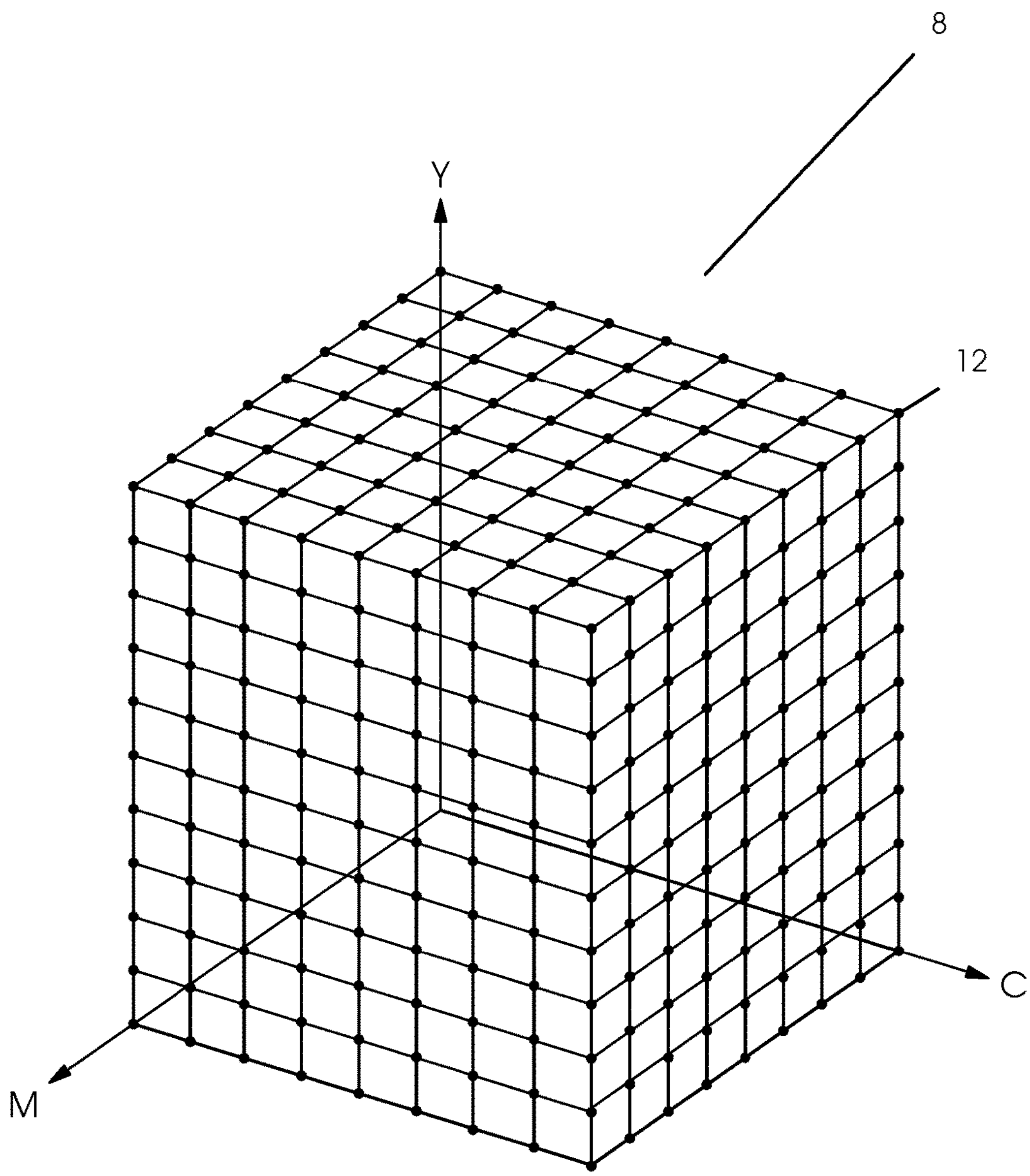
FIG. 3 is a perspective view illustrating a corresponding multidimensional grid in the CMYKOGV process color space.

In this process, the starting point is just such a large regular orthogonal grid 20. The way in which such a grid is represented in the CMY process space and in the Lab space is shown by way of example in the form of the outer layer of such a grid 7, 8 in FIG. 2 for Lab 7 and in FIG. 3 for CMY 8. In general, the process space has more than three dimensions. Consequently, the representation of this grid 7, 8 penetrates itself a number of times in the three-dimensional Lab space and is thus difficult to illustrate.

Figure 4:
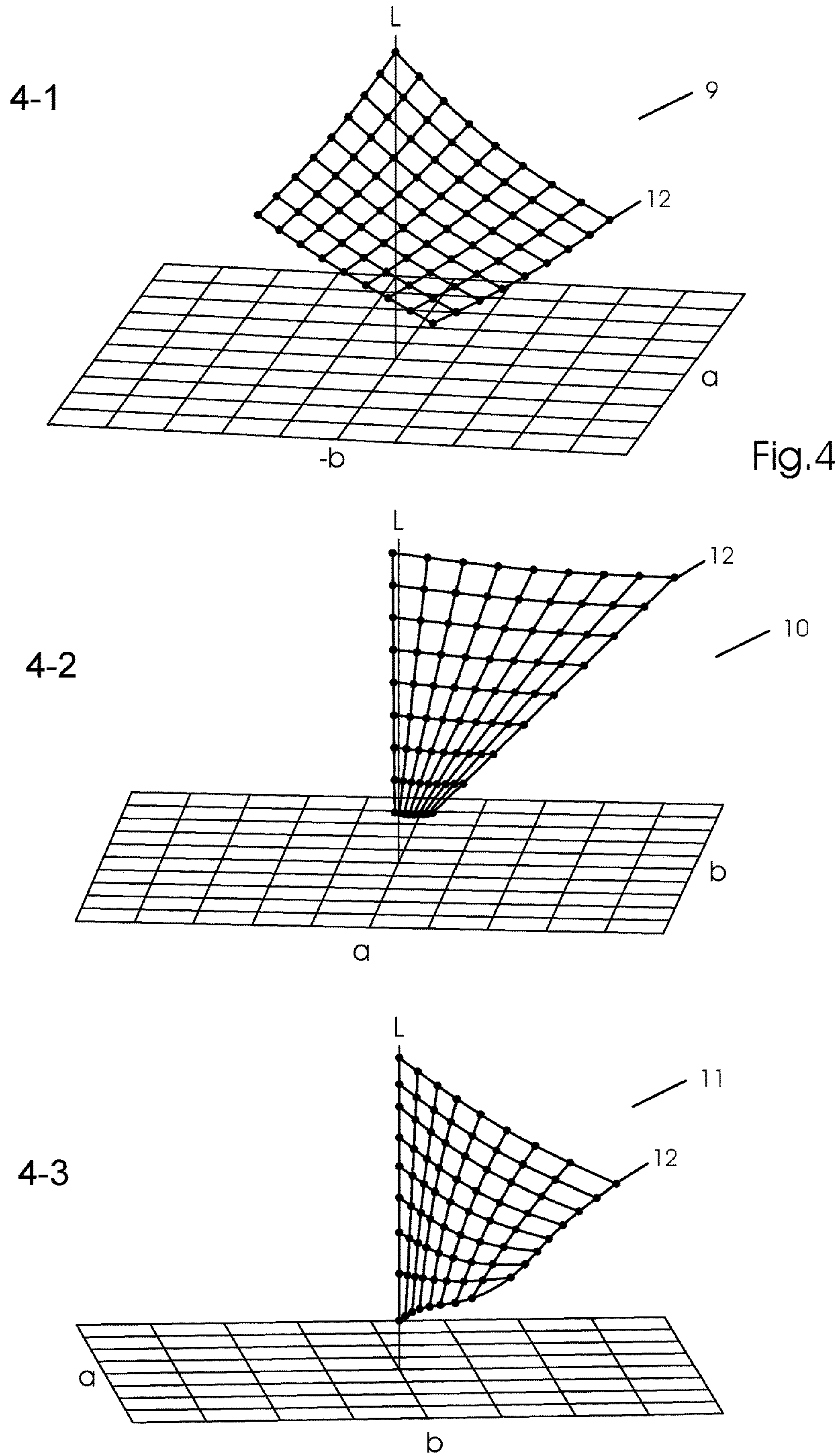
FIG. 4 is a perspective view illustrating selected n−1 dimensional partial grids corresponding to selected process color combinations in the Lab color space.

The principle of the method will firstly be explained on the basis of only two-dimensional processes which, with their measured color values, generate a respective distorted square grid 7 in the Lab space:

A first part (4-1) of FIG. 4 shows a grid 9 of combinations of two print colors cyan and magenta, a second part (4-2) shows a grid 10 of combinations of two print colors yellow and black, and a third part (4-3) shows a grid 11 of combinations of two print colors green and black, both in a range between 0 and 100%.

Figure 5:
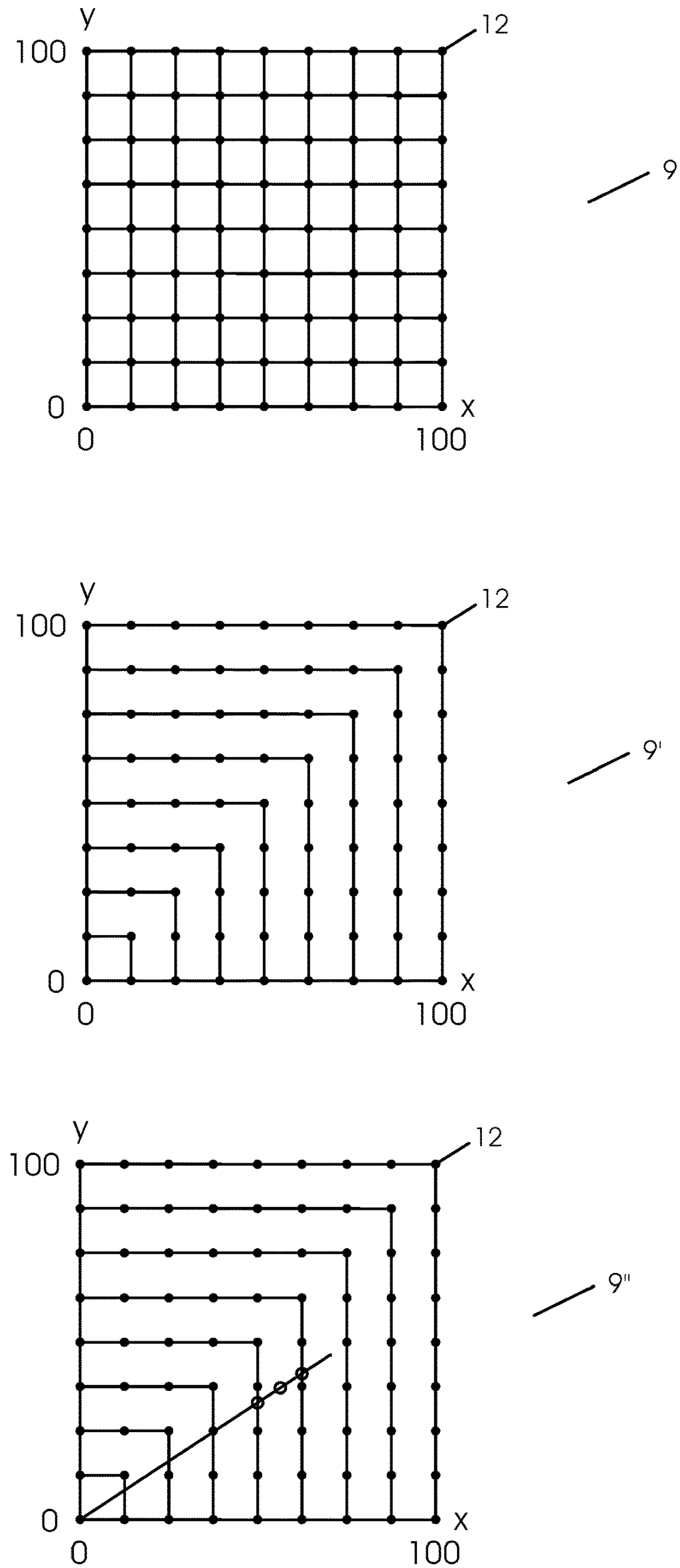
FIG. 5 illustrates an at least two-dimensional segment for the cyan/magenta color combination.

The associated two-dimensional grid in the process space with the general print color proportions x and y is shown in the first part of FIG. 5.

While for a case shown in the part 4-1 the square grid 9 provides a suitable scanning of the process, the grid 10 in the part 4-2 is laterally compressed at the bottom. In this case, there are more points than would be necessary for a perceived regular distribution. In contrast, the points in the case of the grid 11 shown in the part 4-3 are rather compressed in a range of x=100, y=100 along the main diagonal of the process.

In a first step, the points of the regular grid 9 in the first part of FIG. 5 are taken over in an unmodified way as shown in a grid 9' in the second part of FIG. 5, but are considered as a sequence of L-shaped segments, approximately like the layers of an onion. The center about which all segments are grouped is point (0, 0). Every segment itself forms a one-dimensional sequence of points.

In a configuration in accordance with the first part of FIG. 5, one usually treats an arbitrary point x, y between the grid points with the aid of the finite two-dimensional element—in this case a quadrangle—which contains the point. A value or vector of a function that is known for the grid points is for instance bilinearly interpolated from those of the four neighboring points.

In a configuration like the one in the second part of FIG. 5, for an arbitrary point, one initially looks for the two neighboring onion-skin-shaped segments. A straight line is drawn from the point of origin through the defined point x, y as shown in a grid 9" in the third part of FIG. 5. On the inner and outer segments, one interpolates partial results between two points of the one-dimensional segment for the respective intersections. Then, based on the distances to the two segments, a one-dimensional interpolation is made between the two partial results. If one proceeds in this way, it is no longer necessary for all points of the segments to jointly form a regular grid. The different segments may be scanned to different degrees of fineness and the points of a segment may be unevenly distributed.

Figure 6A:
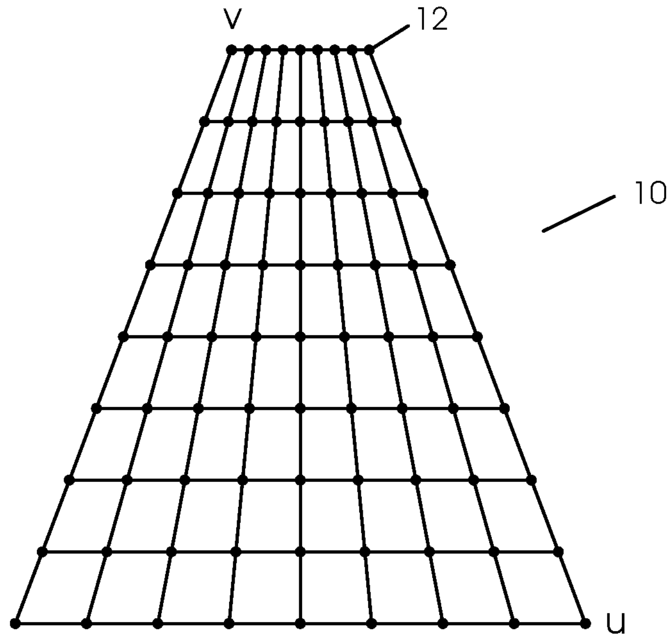
FIGS. 6A and 6B illustrate an at least two-dimensional segment for the yellow/key color combination.
Figure 6A:
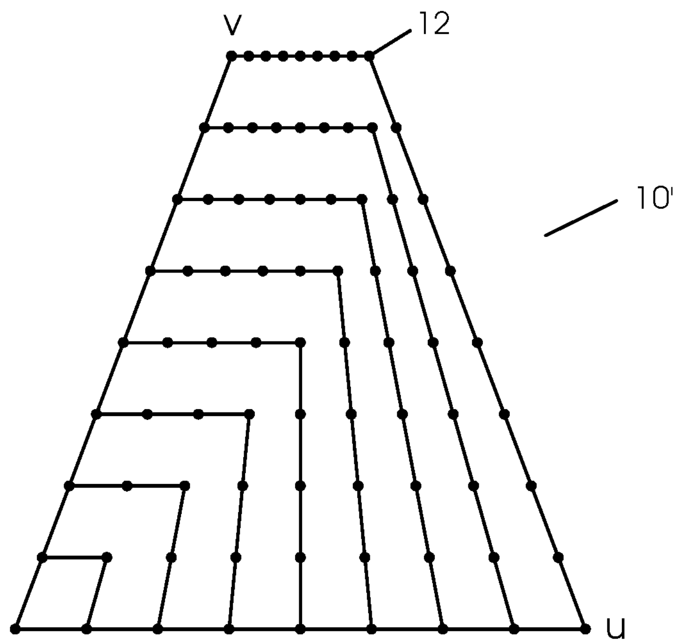
Figure 7A:
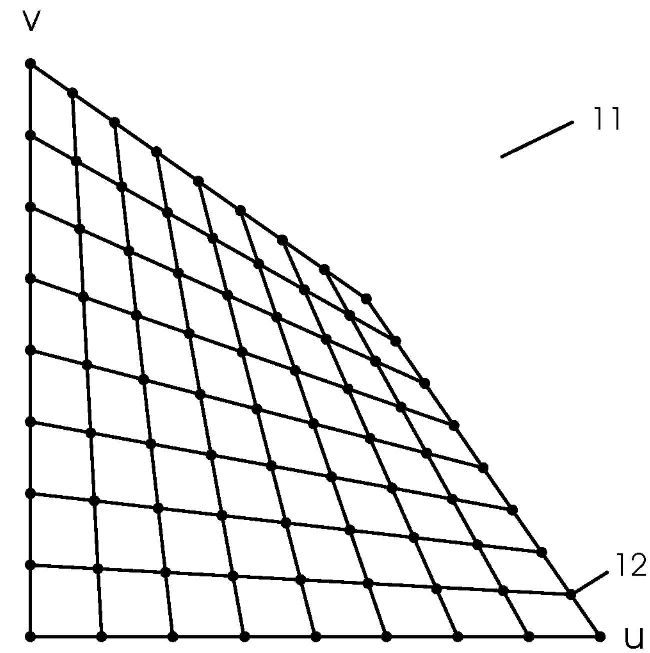
FIGS. 7A and 7B illustrate an at least two-dimensional segment for the green/key color combination.
Figure 7A:
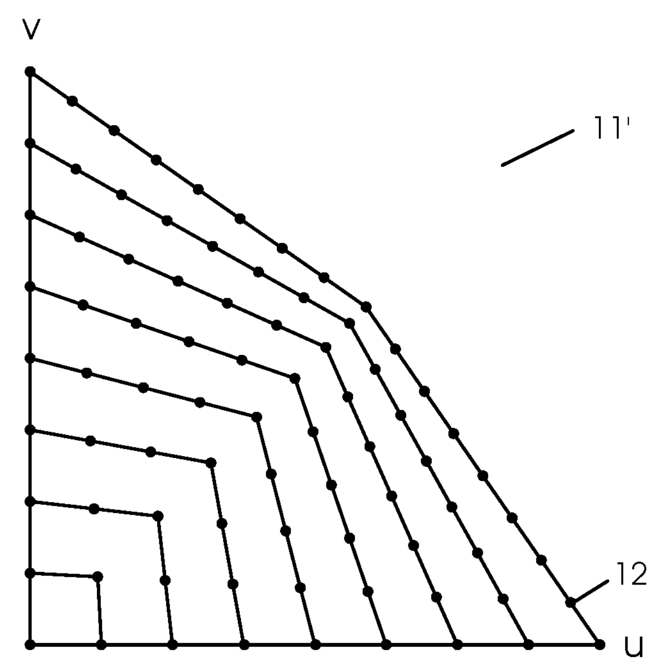

In a simplified schematic form the cases of the grids 10, 11 of the second and third parts of FIG. 4 are shown in a two-dimensional perception-adapted way from a respective suitably selected view of the Lab space with coordinates u and v as a grid 10 in the first part of FIG. 6A and as a grid 11 in the first part of FIG. 7A. The associated onion-skin-shaped configurations of the points can be seen in the grid 10' of the second part of FIG. 6A and in the grid 11' of the second part of FIG. 7A. In the following section, the two segment halves having a constant perpendicular process coordinate x and a constant horizontal process coordinate y will be examined separately.

Figure 6B:
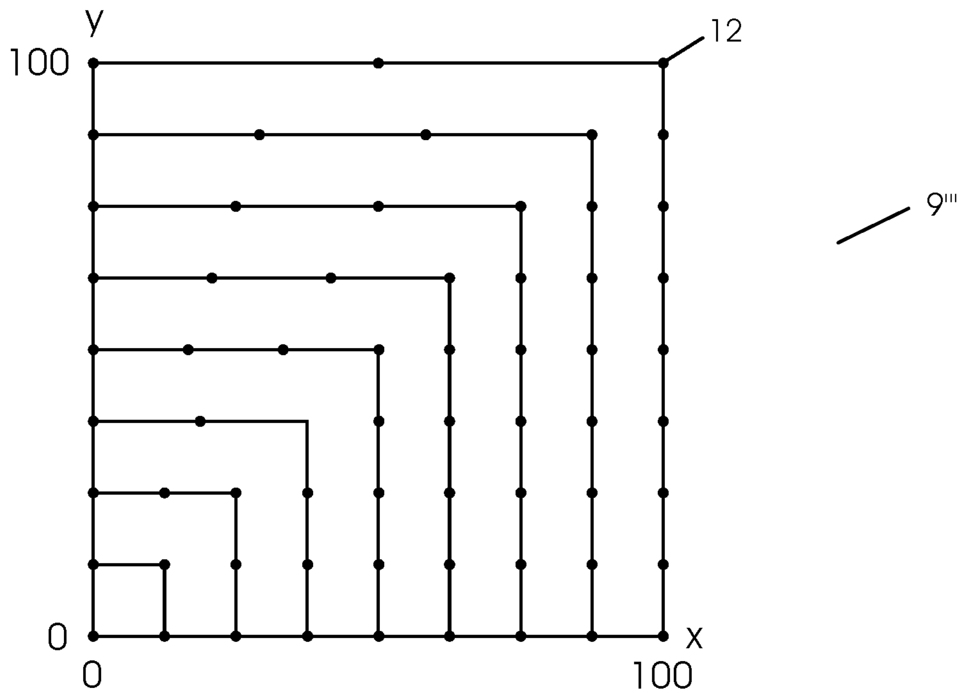
Figure 6B:
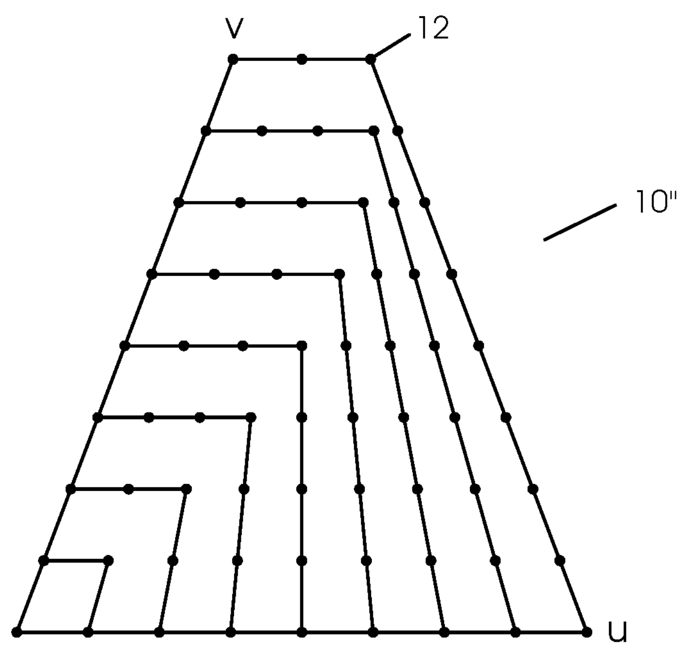

In order to avoid the accumulation of points in the upper region of the second part of FIG. 6A, the segment halves extending in a horizontal direction—are not evenly covered with points in the process space x, y as shown in the second part of FIG. 5 but more coarsely as shown in a grid 9'" in the first part of FIG. 6*b*. The distribution of the points is selected in such a way that in the two-dimensional perception-adapted u, v space the points are distributed in an approximately even way as shown in a grid 10" in the second part of FIG. 6B. In this context, the corresponding points in the process space are in general not part of the regular grid 7 examined above. They are other points of the color transformation, which is in principle known everywhere. The points in x, y may in particular be selected in such a way as to ensure that the distance between neighboring points in the perception-adapted space does not fall below a defined minimum. Then the number of contained points and the relative position thereof on the L-shaped connected line segments needs to be saved for every segment. Since the positions on the connected line segments may be freely chosen, one may limit oneself to 8-bit numbers, for instance, for an accurate representation.

Figure 7B:
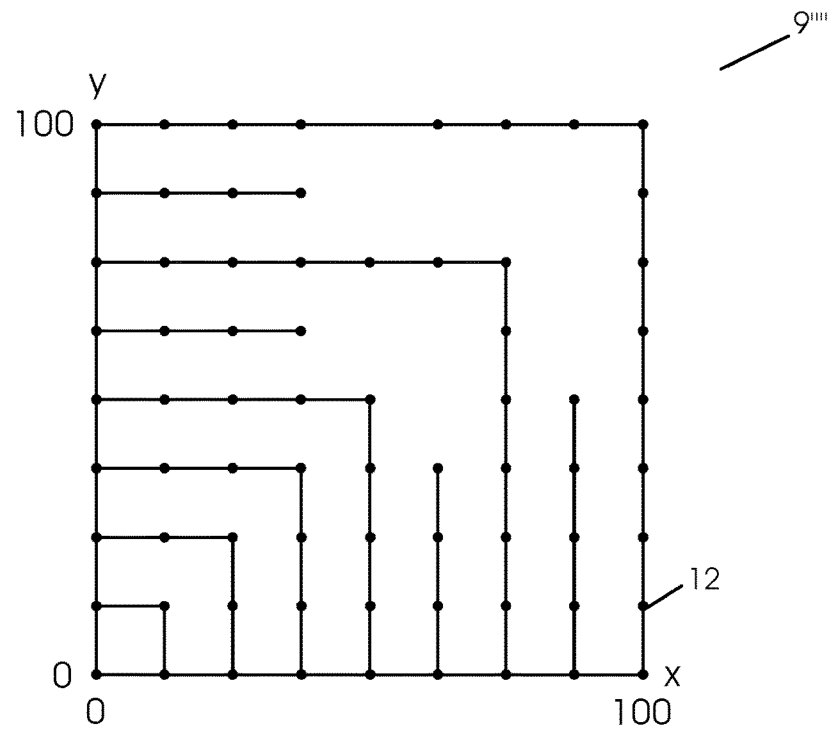
Figure 7B:
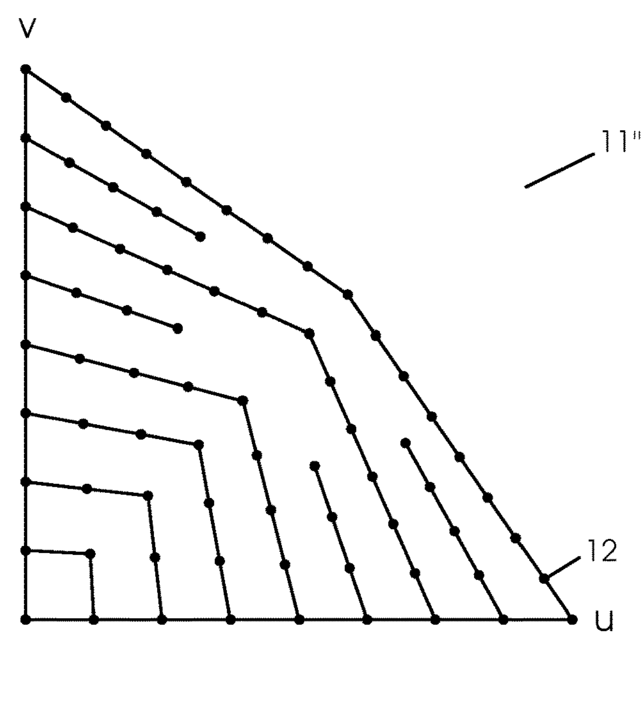

In the other typical case of an accumulation of points in accordance with a grid 11' in the second part of FIG. 7A, it is not the distribution of points on the segments but the density of the segments that provides an opportunity to save memory space. Accordingly, a grid 9"" shown in the first part of FIG. 7B and a grid 11" shown in the second part of FIG. 7B illustrate a configuration in which individual segments do not extend over the entire connected line segments but only a short way into the space starting from the axes. For this purpose, both halves of every segment are represented individually. When interpolating a value of the function for a point between the segments, one looks for the respective closest neighboring segments that cover the area in question and interpolates therebetween based on the corresponding distances.

Figure 8:
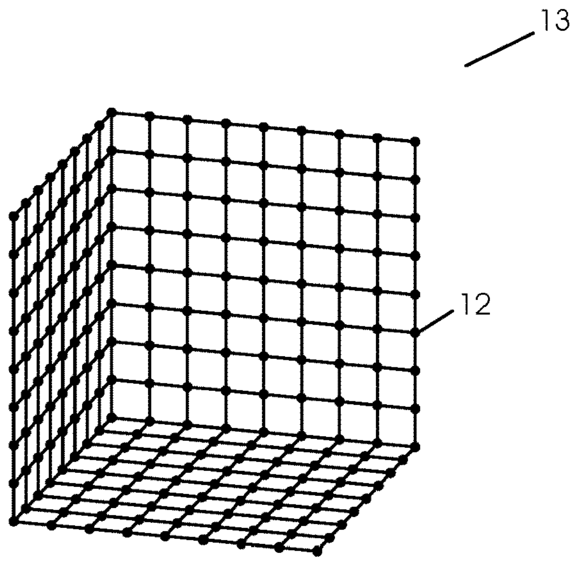
FIG. 8 is a perspective view illustrating an example of a three-dimensional segment.
Figure 9:
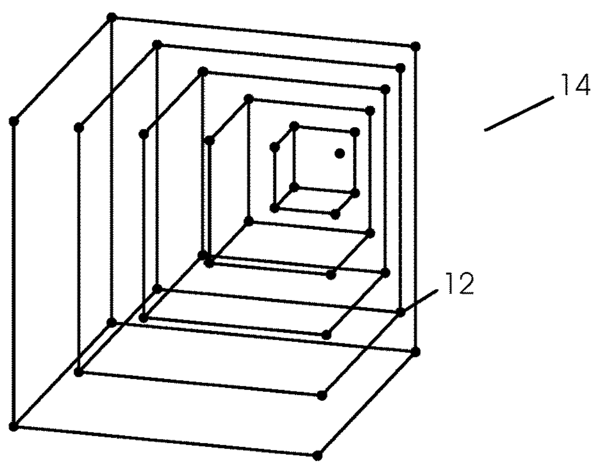
FIG. 9 is a perspective view illustrating an onion-skin-like nestled configuration of three-dimensional partial segments.
Figure 10:
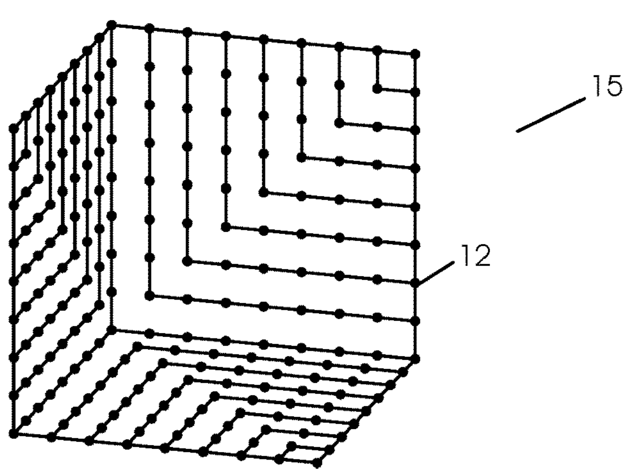
FIG. 10 is a two-dimensional representation of the nestled configuration.

In a three-dimensional process space, three respective interconnected squares that are perpendicular to one another correspond to the L-shaped segments. This is shown in FIG. 8 for the outer cover faces of a cube 13, where at least one of the three print colors has 100%. FIG. 9 shows an onion-skin-like nestled configuration 14 of such structures that may cover the entire process space. Every square portion of a skin may in turn be represented as a two-dimensional process space 15. This is shown in FIG. 10.

Higher-dimensional process spaces may be assembled in a corresponding way out of structures that have one fewer dimension. The leaving out of inner regions of two-dimensional segments, which is shown based on the transition from the second part of FIG. 7A to the second part of FIG. 7B, is then no longer controlled only by a short distance of the segments in the respective two-dimensional subspace but also by a short distance in other directions of the process space to the neighboring higher-dimensional skins. In addition, the varying relevance of different areas of the process space may be factored in by different thresholds for the distances between the points and skins. This results in a further reduction of the required memory space.

The computational effort to select suitable process points/sampling points 12 on the skin-like structures only occurs when the data structures 21 are generated. The only step that needs to be taken for the application of the tables to a given point in the process space is to successively look for the neighboring skins that are significant in every dimension and to interpolate therein.

Figure 11:
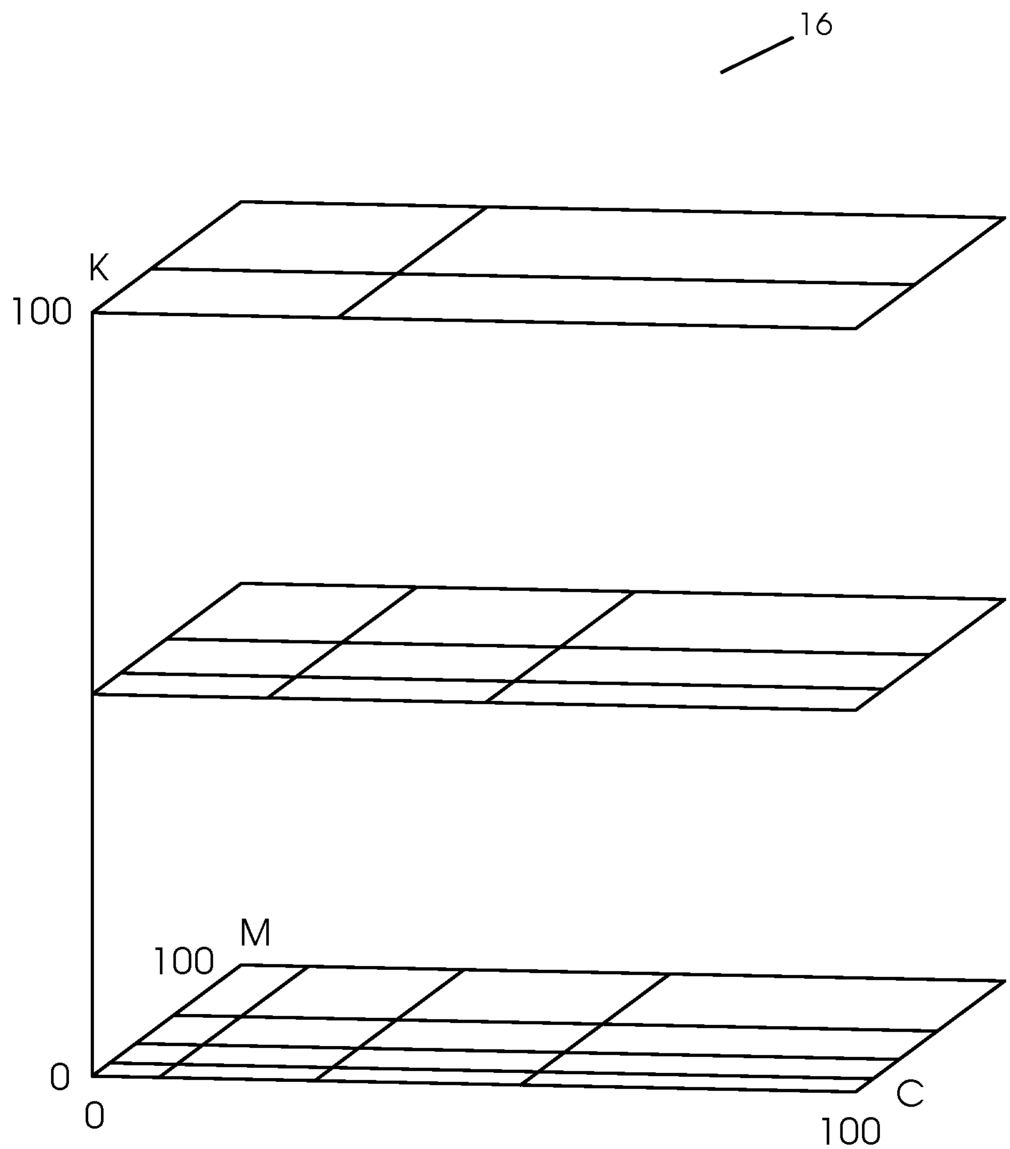
FIG. 11 is a diagram illustrating an example of the distribution of sampling points in the process space with different key planes.

The aforementioned distribution of the points in the process space with the different planes of black 16 as an alternative to the use of ICC profiles 6 is shown in FIG. 11.

The following is a summary list of reference numerals and the corresponding structure used in the above description of the invention:

1 operator
2 printing machine system
3 printing machine
4 control unit
5 database
6 ICC table/profile
7 multidimensional grid in the Lab color space
8 multidimensional grid in the CMYKOGV color space
9, 9', 9", 9''',9"" at least two-dimensional segment for the C/M color combination in various stages of data reduction
10, 10', 10" at least two-dimensional segment for the Y/K color combination in various stages of data reduction
11, 11', 11" at least two-dimensional segment for the G/K color combination in various stages of data reduction
12 sampling point/process point
13 three-dimensional segment formed of assembled two-dimensional segments
14 onion-skin-like nestled configuration of three-dimensional partial segments
15 two-dimensional representation of the onion-like nestled configuration
16 distribution of sampling points in the process space with different key planes
17 test chart
18, 18' original and modified characterization data
19 model
20, 20' original and data-reduced model converted to multidimensional grid structure
21 data structure with reduced multidimensional grid structure
22 data-reduced test chart

The invention claimed is:

1. A method for carrying out a printing operation on a printing machine with computer-assisted color space transformation by using tables formed of n-dimensional orthogonal grids, the method comprising the following steps:

printing a test chart suitable for the printing operation and colorimetrically measuring the test chart in a target color space to generate measured values corresponding to sampling points in the measured target color space;

interpolating between the sampling points to determine further sampling points;

using existing sampling points to create an ICC table for color space transformation between the target color space and a process color space for the printing operation;

using the computer for isolating suitable combinations of n−1-dimensional partial grids for corresponding process color combinations from n-dimensional orthogonal grids of the ICC table in the process color space;

converting the partial grids into a sequence of at least two-dimensional segments;

modifying the sampling points of individual at least two-dimensional segments to remove non-required sampling points for evenly distributing the sampling points in the partial grid;

reintegrating the partial grids into the n-dimensional orthogonal grid, and carrying out color management of the printing operation and the printing operation using the ICC table having been reduced.

2. The method according to claim 1, which further comprises:

using the CMYK color space or a process space containing the CMYK color space as a subset as the process color space; and using the Lab color space as the measured target color space.

3. The method according to claim 1, which further comprises:

structuring the at least two-dimensional segments to be L-shaped in the two-dimensional space; and adapting the L-shaped segments in accordance with additional dimensions in higher-dimensioned spaces.

4. The method according to claim 1, which further comprises carrying out the even distribution of the sampling points by reducing sampling points on one-dimensional axes of the at least two-dimensional segments.

5. The method according to claim 1, which further comprises carrying out the even distribution of the sampling points by reducing a density of the at least two-dimensional segments in the partial grid.

6. The method according to claim 1, which further comprises for more than two- dimensional partial grids, carrying out the even distribution of the sampling points by a reduction of a density of the two-dimensional segments in the same two-dimensional partial grid and by a reduction of at least two-dimensional segments of neighboring higher-dimensional skins from other directions of the process space.

7. The method according to claim 1, which further comprises selecting a number n of dimensions in n-dimensional orthogonal grids of the ICC table in dependence on a number of process colors being used.

8. The method according to claim 1, which further comprises carrying out a further step of generating a reduced test chart based on an ICC table having been reduced, and reduced sampling points of the ICC table corresponding to reduced color patches in the test chart.

* * * * *